June 4, 1957  O. PRZYSTAWIK  2,794,674
FOUNTAIN INSTALLATION DISASSEMBLING FEATURES
Filed Aug. 31, 1953  2 Sheets-Sheet 1
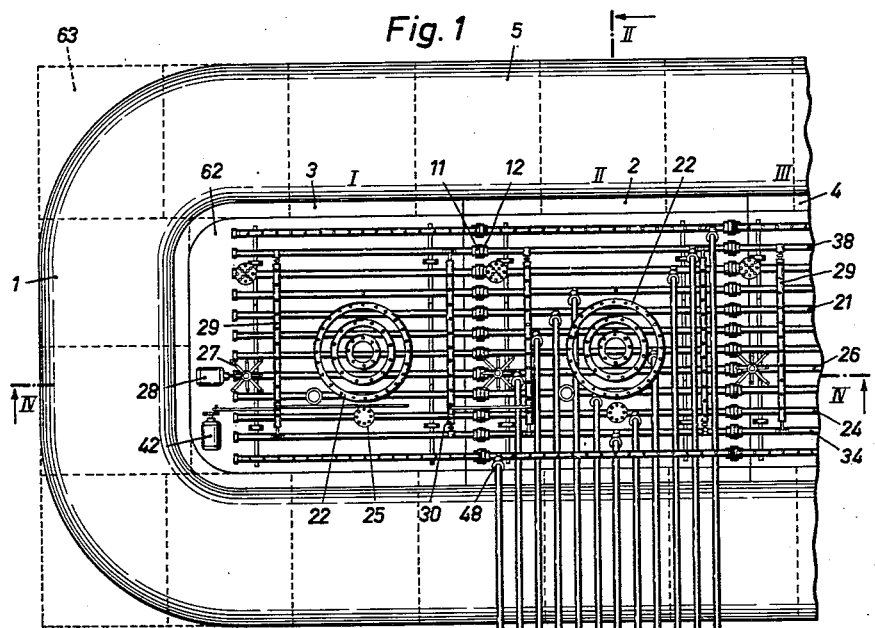
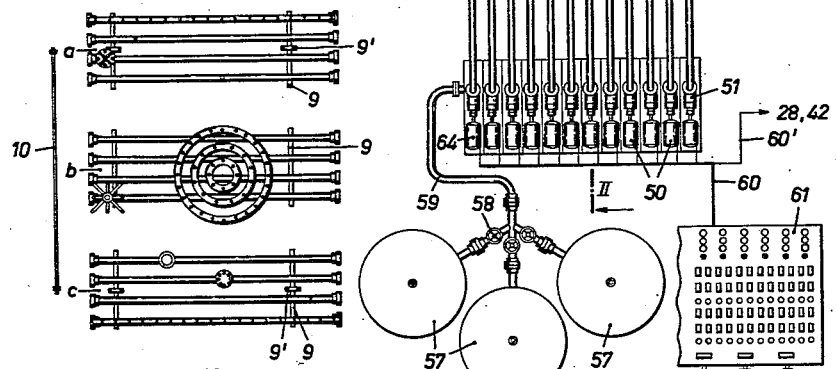
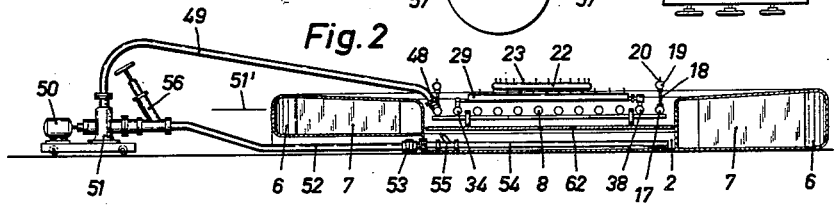
Inventor:
Otto PRZYSTAWIK
by 
Attorney

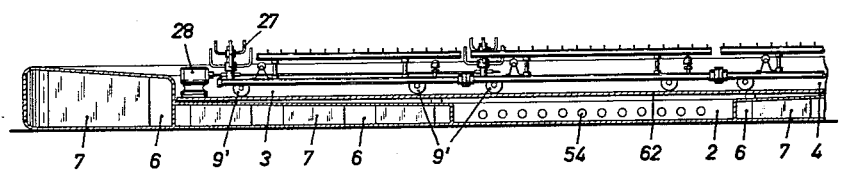
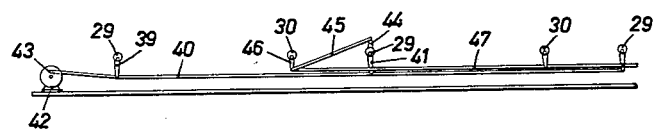
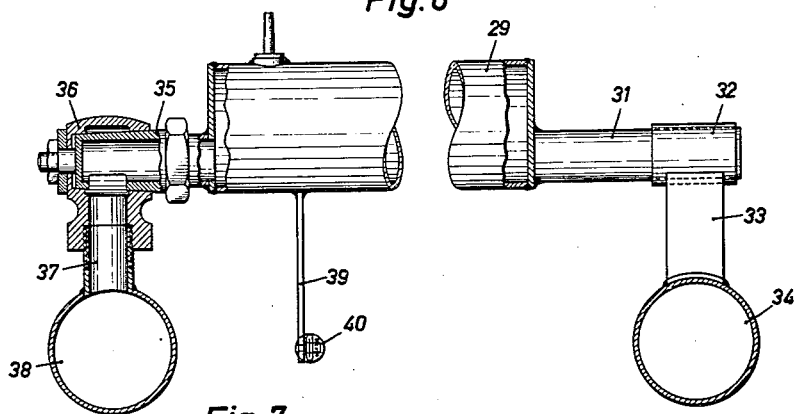
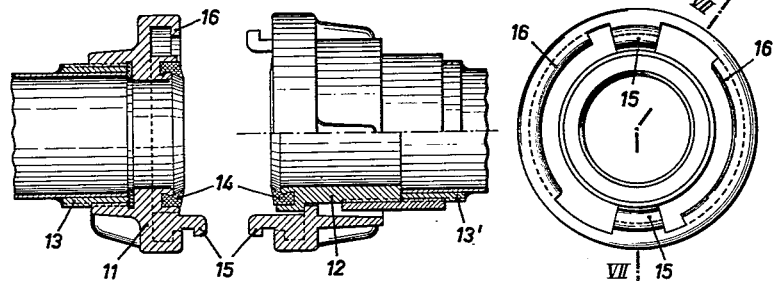

United States Patent Office 2,794,674
Patented June 4, 1957

2,794,674

FOUNTAIN INSTALLATION DISASSEMBLING FEATURES

Otto Przystawik, Berlin-Lichterfelde-Ost, Germany, assignor to Dancing Waters, Inc., New York, N. Y., a corporation of New York Application August 31, 1953, Serial No. 377,591

Claims priority, application Germany September 2, 1952

6 Claims. (Cl. 299—7)

This invention relates to fountains, and more particularly to a fountain installation, wherein pipes on one hand connected with controllable supply conduits and on the other hand connected with spraying nozzles are placed in a tub.

Installations of this kind are used especially in exhibitions, on stages or the like. Owing to the rather large size of such installations it is hitherto customary to fix same immovably to the floor of a stage and to cover same by suitable covering means when they are not used. However, a soiling of the tub of such a fixed fountain installation cannot be avoided, so that dirt particles enter the pipe lines and the pump system during the operation of the device. Therefore, the operation of such a fountain installation is greatly impaired.

An object of the present invention is to provide a fountain installation which may be readily set up and taken apart in a short time. Thus, on one hand a soiling of the installation during the period of non-use is avoided, and on the other hand, it is possible to transfer the installation in any desired manner from one place to another one and even to set same up on a stage without any change of the latter.

Another object of the invention is to improve on the art of fountain installations as now ordinarily made.

Other objects and structural details of the invention will be apparent from the following description when read in conjunction with the accompanying drawings forming part of this specification, wherein:

Fig. 1 is a fragmentary top plan view of the main portion of the fountain installation having three groups of pipe lines with twelve pipe lines each, Fig. 2 is a sectional view taken on line II—II of Fig. 1, Fig. 3 is a top plan view of a disassembled group of pipe lines, Fig. 4 is a sectional view taken on line IV—IV of Fig. 1, Fig. 5 is a side elevational view of a detail of the installation, Fig. 6 is an elevational view of the detail shown in Fig. 5, partly in section, Fig. 7 is an elevational view of two parts of a pipe coupling, partly in section along line VII—VII of Fig. 8, and Fig. 8 is a front elevational view of one of the two halves of the pipe coupling shown in Fig. 7.

Referring to Fig. 1, a tub 1 of elongated shape, made of an elastic material, for example rubber, contains the system of pipe lines of the installation when the latter is ready for operation. As best shown in Figs. 2 and 4, the center portion of the tub has a deep trough 2; troughs 3 and 4 respectively of less depth are arranged next to said deep trough 2 at both sides thereof. Furthermore the tub 1 has a comparatively wide rim 5 surrounding the troughs. The tub 1 may be brought into and held in the desired shape by blowing air into inflatable chambers 6 formed by a double bottom and arranged within the range of the troughs 3 and 4 of the rim 5. The chambers 6 are formed by flexible partitions 7 aiding in maintaining the shape of the tub. It is sufficient to provide only one chamber with a closable valve (not shown) for the supply of compressed air as all of the chambers communicate with each other. Of course, if desired, a plurality of valves may be arranged in chambers of the tub; in such a case the deflating of the tub may be carried out at a faster speed.

The installation shown in the drawings has twelve pipe lines 8 arranged parallel to each other at predetermined distances from each other. Said pipe lines 8 are divided into three groups I, II and II, the groups I and III being located in the range of the troughs 3 and 4 respectively and the group II being located in the range of the deep trough 2 (see Figs. 1 and 4). Each group has twelve pipe sections, an exemplary length of the pipe sections being 2.5 meters. As best shown in Fig. 3, the pipe-sections of a group, for example of group I are subdivided into three sub-groups a, b and c. The pipe-sections of each sub-group are welded onto transversely extending tubular rods 9 which may be connected with each other by a screw bolt inserted therein for forming above mentioned group of pipe-sections. The two extreme sub-groups a and c are provided with wheels 9′ rotatably arranged on the center portion of the tubular rods 9 pertaining to said sub-group.

Each pipe-section of the pipe lines 8 is provided at its ends with coupling elements designed in such a manner that the pipe-sections of adjacent groups of pipe-sections may be tightly connected with each other. Figs. 7 and 8 illustrate an embodiment of such coupling elements. Sleeves 13 and 13′ having an exterior thread are welded to the ends of the pipe-sections. The coupling members 11 and 12 are tightly screwed onto said sleeves 13 and 13′ respectively. Each of the coupling members 11 and 12 has a packing ring 14 partly projecting from the coupling member. Furthermore, each coupling member 11 and 12 is provided with hook-like portions 15 arranged for gripping engagement with the inner surface of a sectional annular flange 16 of the complementary coupling when the coupling members are engaged with each other.

If a group of pipe-sections is used as a group arranged at one of the ends of the installation, for example the groups I and III, the outermost ends of the pipe-sections are sealed by closing elements or by welding. However, if it is desired to use more than three groups of pipe-sections for a subsequent setting-up of the installation, additional groups having coupling elements at both ends of their pipe-sections are inserted into the arrangement. The division of a group of pipe-sections into sub-groups, described in connection with Fig. 3, is also applied to the groups II and III.

The pipes lines 8 are provided with jet nozzles of different construction. The pipe-sections 17 (see Fig. 2) arranged at an outer end of each group carry tubes 18 projecting upwardly and supporting sections 19 extending parallel to the above described pipe-sections. The sections 19 closed at their ends are provided with a plurality of spray nozzles 20, preferably of the adjustable type, said spray nozzles being arranged along the length of said sections. The pipe line 21 (see Fig. 1) carries pipe rings 22 through the medium of pipe supports. Said pipe rings 22 are provided with a plurality of spray nozzles 23 extending upwardly and being arranged along the circumference of said pipe rings. Each ring of an additional series of rings arranged within the ring 22 is connected with an additional pipe line. The pipe line 24 is provided with roseheads 25. The pipe line 26 is provided with rotatable eight-fold nozzles 27, which may be driven by an electro-motor 28. It is understood that the various forms of nozzles capable of use in the installation is not limited to the type of nozzles mentioned above. For example, each group of pipe-sections is also provided with two nozzle pipes 29 and 30 extending in a direction perpendicular to the direction of the longitudinal axis of the pipe-sections, one of said two nozzle pipes being illustrated in Fig. 6 in an enlarged scale. A pin 31 welded to the closed end of the nozzle pipe 29 is journalled in a bearing 32 carried by a support 33 secured to a pipe-section 34. A hollow cone 35 having an inlet opening is screwed onto an extension arranged at the opposite end of the nozzle pipe 29. Said cone 35 is rotatably arranged in a casing 36 communicating with a pipe-section 38 through a tube 37. A dependent control arm 39 welded to the nozzle pipe 29 is pivotally connected with a rod 40. As best shown in Fig. 5, a dependent arm 41 of the corresponding nozzle pipe 29 of the next group is also pivoted to said rod 40. Said rod 40 is reciprocated by means of an electric motor 42 and a crank 43. The nozzle pipe of the group provided with the dependent arm 41 has an additional erect arm 44 connected with dependent arm 46 of the nozzle pipe 30 through the medium of a link 45. Furthermore, a link 47 leading to the dependent arms on the corresponding nozzle pipe of adjacent group or groups is pivoted to the arm 46. Thus, the nozzle pipes 29 and 30 of each group will be oscillated in opposite directions by reciprocation of the rod 40. The nozzle pipe or pipes 29 respectively communicate with the pipe line 38 (Fig. 1) and the nozzle pipe or pipes 30 respectively communicate with the pipe line 34. If desired, instead of oscillating the nozzle pipes 29 and 30 in opposite directions, it is also possible to design the controlling mechanism in such a way that all of the nozzle pipes are oscillated in the same direction. Of course, different combinations of movement are also feasible. As will be pointed out hereinafter the pipe lines 34, 38 are capable of being fed selectively with water under pressure to obtain sundry ornamental effects.

One of the groups of pipe-sections, for example the center group II according to the embodiment shown in the drawings, is provided with connections 48 for supply conduits 49. Said connections comprise disengageable couplings, for example of the type described above. The supply conduits 49 could be made of flexible hoses. Each pipe line of the installation is connected with a separate supply conduit 49. Each supply conduit 49 is connected with a separate pump 51 operable by an electric motor 50. The inlet of each pump 51 is connected with a pipe or flexible hose 52 (see Fig. 2) which, in turn, is connected through the medium of a coupling 53 with a suction pipe 54 extending into the trough 2. The pumps 51 must be arranged in such a relation to the tub 1, that all of the inlets are at a level below the highest level of the water in the troughs when the fountain installation is not in operation and consequently a filling of the pumps 51 with water prior to the operation is obtained so as to assure a delivery of water by the pumps upon actuation thereof. Said highest level of the water is indicated in Fig. 2 by the line 51'. The suction pipes 54 have a slot extending at the lower side thereof from end to end so as to obtain a maximum suction of the inlet opening. A check valve 55 arranged in each suction pipe 54 prevents water from flowing out of the inlets of non-operating pumps 51 when the level of the water in the tub 1 falls below the level of the inlets owing to the operation of one or more of the other pumps. A manually operable throttle valve 56 is arranged in each pipe 52 connected with the inlet of the associated pump 51.

Each outlet of three water supply tanks 57 is connected with a valve 58. Said valves 58 are connected with a conduit 59 leading to one of the pumps 51 which is of especially large dimensions. The system of conduits communicating with the supply tanks 57 is also provided with couplings so that it may be readily taken apart. Preferably, the supply tanks 57 and the assembly of pumps 51 are provided with rollers or wheels or are mounted on carriages, so that they may be readily moved from one place to another one.

The electrical parts of the electric motors 28, 42 and 50 are connected by a disengageable cable 60, 60' with a switchboard 61 comprising the necessary main switch, starter, fuses, etc. for the electric motors. The switchboard comprises also keys for selectively switching on and switching off the motors individually or in various combinations. Preferably, the switchboard 61 is provided with wheels or rollers or is mounted on a carriage for an easy transfer from one place to another one. For the operation of the installation the switchboard 61 is located at a place from which the operator may readily observe the entire installation.

The installation according to the invention may be disassembled into a plurality of parts, each of which having a size which permits it to be packed easily, for example in a box. For the setting up of the installation, at first the tub 1 is spread on the floor whereon it is inflated. At the same time the individual groups of the pipe-sections are assembled by rigidly connecting the sub-groups shown in Fig. 3 by means of two screw bolts 10 inserted into the tubular rods 9. Thereafter, the suction pipes 54 inserted into the trough 2 are watertightly passed through openings of the side wall of said trough. Additional water jet devices, for example the transverse nozzle pipes 29 and 30, are connected with the system as desired. For this purpose, for example the pin 31 (Fig. 6) of the nozzle pipe 29 is inserted into the bearing 32, whereupon the nozzle pipe is slightly retracted for connection at its other end by the screw connection with the rotatable cone 35. Then, the link mechanism is connected with the oscillatably mounted nozzle pipe 29. Each pump 51 of the assembly of pumps brought into proper position is connected with a suction pipe 54 by means of a coupling 53 arranged at the end of a pipe or hose 52 connected with the inlet of the pump. Then a board or a plurality of boards forming a bottom 62 (see Figs. 2 and 4) is placed into the tub 1, said bottom 62 covering the suction pipes 54 and bridging the deep trough 2. It would also be sufficient to place merely two boards or sheet metals extending in the direction of the longitudinal axis of the tub 1 into the trough 2, as the bottom to be formed mainly serves the purpose of forming a track for the wheels 9'. Then, the groups of pipe-sections are rolled in proper sequence into the tub 1 over a bridge made by boards resting on the floor and on the rim of the tub. The pipe-sections are connected with each other by the couplings. Furthermore, the supply conduits 49 are connected with the pumps 51 of the assembly of pumps. The electric motors 28 and 42 are also installed. Finally the water supply tanks 57 are connected with the pipe system, and the switch board 61 is connected with the electric means respectively, whereupon the installation is ready for operation. One or more valves 58 controlling the supply of water from the tanks 57 are opened, as needed. The motor 64 connected with the pumps capable of filling the pipe system with water from the tanks 57 is switched on for pumping such an amount of water into the tub as is required by the size of the installation. The other pumps of the assembly of pumps are filled with water flowing from the suction pipes 54 through the conduits 52 into the pumps. Then the level of the water in the trough 2 reaches its maximum height indicated by the line 51' (Fig. 2). If desired, the water supply tanks 57 may be removed from the stage upon disengagement of a coupling, before the fountain installation is put into operation.

The height of the jets produced by each pipe may be adjusted by means of the throttle valves 56 while the pumps operate at highest output, so that the height of the jets can be readily adapted to the available space in the room where the installation is located. Now, the operator may operate the various pumps with adjustable outputs in any desreid sequence or combination by means of instruments of the switchboard. Furthermore, other instruments of the switchboard may be used for controlling the electrical and mechanical drives of the nozzle bodies, for example the oscillatable nozzle pipes 29 and 30 or the rotatable eight-fold nozzles 27. The electric circuit including the various electric means of the installation is not the subject matter of this invention so that a detailed description thereof is unnecessary.

Although the embodiment of the fountain installation shown in the drawings contains only three groups of pipe-sections with an overall length of approximately 7.5 meters of each pipe line, the installation may be enlarged by the addition of additional groups of pipe-sections; of course, such an enlarged installation requires a tub of greater length.

Instead of forming the tub by a plurality of inflatable chambers, the tub may be also produced in such a manner that a plurality of containers, for example boxes, being assembled in the shape of a tub and being connected with each other are covered with a rubber sheet. Thus, for example, the rim of the tub may be formed by a plurality of boxes 63 shown in dash lines in Fig. 1, said boxes surrounding a space corresponding to the trough of the tub. Then a sheet of rubber or other waterproof material is placed onto the rectangle of boxes, whereby the tub is formed. If desired, containers of smaller height may also be placed under the rubber sheet for the formation of troughs of different depth. This embodiment has the advantage that the size of the tub may be readily changed; a tub of smaller size requires merely the use of a smaller number of boxes and the tucking in of the rubber sheet.

I have described preferred embodiments of my invention, but it is understood that this disclosure is for the purpose of illustration and that various omissions are changes in shape, proportion and arrangement of parts, as well as the substitution of equivalent elements for those herein shown and described may be made without departing from the spirit and scope of the invention as set forth in the appended claims.

What I claim is:

1. A fountain installation, comprising in combination: a plurality of portable pipe sections, means for connecting predetermined pipe sections of said plurality of pipe sections in series so as to form a plurality of pipe lines, spraying means associated with said pipe lines, a portable tub, said pipe lines being placed into said portable tub, a plurality of portable supply conduits for the supply of water to said pipe lines, means for connecting said supply conduits with said pipe lines, controlling means associated with said supply conduits for controlling the supply of water through said supply conduits to said pipe lines, a portion of said tub being deeper than other portions thereof, a wall of said tub having a plurality of apertures, a plurality of suction pipes placed into said deeper portion of said tub and passing watertightly through said apertures, and a plurality of pumps arranged outside said tub, said suction pipes being connected with said pumps, and said pumps being connected with said supply conduits.

2. A fountain installation, comprising: an odd number of portable groups of pipe sections, representing individual units, a portable tub, the center portion of said tub being deeper than the side portions thereof, said groups of pipe sections being arranged in a row in said tub, and the center group of said groups of pipe sections being in register with said center portion of said tub, means for connecting adjacent ends of said pipe sections of said groups of pipe sections so as to form a plurality of pipe lines, spraying means associated with said pipe lines, a plurality of portable supply conduits for the supply of water to said pipe lines, means for connecting said supply conduits with said pipe lines, controlling means associated with said supply conduits for controlling the supply of water through said supply conduits to said pipe lines, a wall of said tub having a plurality of apertures, a plurality of suction pipes placed into said center portion of said tub and passing watertightly through said apertures, and a plurality of pumps arranged outside said tub, said suction pipes being connected with said pumps, and said pumps being connected with said supply conduits.

3. A portable assembly for the formation of a fountain installation capable of being placed, at least partially, into a reservoir, comprising: a plurality of pipe sections, first coupling means including cooperating parts for rapidly connecting predetermined numbers of pipe sections of said plurality of pipe sections in series so as to form a plurality of pipe lines extending adjacent to each other, spraying means associated with said pipe lines, a plurality of portable supply conduits for the supply of water to said pipe lines, second coupling means including cooperating parts for rapidly connecting said supply conduits with said pipe lines, said cooperating parts of said first and second coupling means being disengageable for a rapid disassembly of the assembled elements for transporting same, and controlling means associated with said supply conduits for controlling the supply of water through said supply conduits to said pipe lines, said plurality of portable pipe sections being divided into a number of portable sub-groups of pipe sections consisting of pipe sections of adjacent pipe lines, the pipe sections of each sub-group of pipe sections being rigidly connected with each other so as to form portable sub-group units.

4. A portable assembly according to claim 3 in which the number of pipe sections of each sub-group of pipe sections are parallel to each other.

5. A portable assembly according to claim 3 in which the number of pipe sections of each sub-group unit is smaller than the number of adjacent pipe lines, whereby adjacent sub-group units are detachably connected with each other to form groups including a number of pipe sections equal to the number of adjacent pipe lines.

6. A portable assembly for the formation of a fountain installation capable of being placed, at least partially, into a reservoir, comprising: a plurality of portable pipe sections, first coupling means including cooperating parts for rapidly connecting predetermined numbers of pipe sections of said plurality of pipe sections in series so as to form a plurality of pipe lines extending adjacent to each other, spraying means associated with said pipe lines, said plurality of portable pipe sections being divided into an odd number of groups of pipe sections consisting of pipe sections of adjacent pipe lines, said groups of pipe sections being arranged in a row, a plurality of portable supply conduits for the supply of water to said pipe lines, second coupling means including cooperating parts for rapidly connecting said supply conduits to the pipe lines of the center group of pipe sections, said cooperating parts of said first and second coupling means being disengageable for a rapid disassembly of the assembled elements for transporting same, and controlling means associated with said supply conduits for controlling the supply of water through said supply conduits to said pipe lines.

References Cited in the file of this patent

UNITED STATES PATENTS

| | | |
|---|---|---|
| 556,090 | Dunlap | Mar. 10, 1896 |
| 618,398 | Darlington | Jan. 31, 1899 |
| 634,569 | Brainard | Oct. 10, 1899 |
| 954,059 | Sweeney et al. | Apr. 5, 1910 |
| 1,058,464 | Pritchard | Apr. 8, 1913 |
| 1,233,119 | Parker | July 10, 1917 |
| 1,895,739 | Spindt | Jan. 31, 1933 |
| 1,960,472 | Balaam | May 29, 1934 |